United States Patent [19]

Määttä

[11] Patent Number: 4,613,434
[45] Date of Patent: Sep. 23, 1986

[54] DEVICE FOR TREATMENT OF WASTEWATER BY MEANS OF ANAEROBIC FERMENTATION

[75] Inventor: Raimo Määttä, Helsinki, Finland

[73] Assignee: Oy Tampella AB, Finland

[21] Appl. No.: 458,816

[22] Filed: Jan. 18, 1983

[51] Int. Cl.$^4$ .............................................. C02F 11/04
[52] U.S. Cl. .................................. 210/151; 210/180; 210/188; 210/197
[58] Field of Search .............. 210/603, 613, 616, 617, 210/618, 150, 151, 180, 188, 194, 197

[56] References Cited

U.S. PATENT DOCUMENTS

| | | | |
|---|---|---|---|
| 2,202,772 | 5/1940 | Durdin | 210/603 |
| 2,538,412 | 1/1951 | Cecil | 210/603 |
| 2,881,137 | 4/1959 | Logan | 210/603 |
| 2,889,929 | 6/1959 | Kivell | 210/603 |
| 3,293,174 | 12/1966 | Robjohns | 210/617 |
| 4,022,665 | 5/1977 | Ghosh | 210/603 |
| 4,076,615 | 2/1978 | Olesen | 210/616 |
| 4,076,616 | 2/1978 | Verde | 210/618 |
| 4,188,289 | 2/1980 | Besik | 210/617 |
| 4,253,947 | 3/1981 | Fan | 210/618 |
| 4,284,508 | 8/1981 | Jewell | 210/603 |
| 4,294,694 | 10/1981 | Coulthard | 210/150 |
| 4,336,135 | 6/1982 | Price | 210/151 |

FOREIGN PATENT DOCUMENTS

| | | | |
|---|---|---|---|
| 2841011 | 4/1980 | Fed. Rep. of Germany | 210/617 |
| 53-63765 | 6/1978 | Japan | 210/617 |
| 54-54453 | 4/1979 | Japan | 210/616 |
| 54-115550 | 9/1979 | Japan | 210/618 |
| 2054549 | 3/1980 | United Kingdom | 210/603 |

Primary Examiner—Ernest G. Therkorn
Attorney, Agent, or Firm—Biebel, French & Nauman

[57] ABSTRACT

The invention relates to a device for treatment of wastewater by means of an anaerobic fermentation, which comprises a closed tank 1 and therein elements 2, 10 for feeding wastewater to be treated into the tank, elements 5, 6 3 for removing treated water, gas and sludge from the tank, elements 4 for mixing the contents of the tank and elements 7 for separating gas in the upper part of the tank. Deviating from the traditional completely mixed reactors the tank has been devided into two, on each other placed parts by means of the filters, which tank comprises a filter media bed containing at least one filter media which acts as an attachment bed for methane bacteria and on it a sludge and fluidized material bed, whereat the mixing elements 4 are below the filter and the feed elements 2, 10 for wastewater to be treated are fed below the filter 8 and the elements 5, 6 for removing treated water and gas are located in the tank part above the filter 8. In this way the cheap and simple device has been accomplished for treatment of wastewater, in which it has essentially been shown how acid and methane bacteria are mixed with each other.

9 Claims, 2 Drawing Figures

DEVICE FOR TREATMENT OF WASTEWATER BY MEANS OF ANAEROBIC FERMENTATION

BACKGROUND OF THE INVENTION

The present invention relates thus to the device for treatment of wastewater which contains biologically degradeable organic material by means of anaerobic fermentation. Treatment of organic material is performed by both facultative and obligate anaerobic bacteria during anaerobic fermentation. Carbohydrates, proteins and lipids are at first hydrolized and thereafter these hydrolysis products are further digested mostly into acetic acid, hydrogen and carbon dioxide. The final digestion is performed by means of methane producing bacteria. At least two types of bacteria have so to be used for the best possible result. Acid producing bacteria act best in the low pH range of about 5.0–6.0 and methane producing bacteria best in the pH range of 7.0–7.5. Except that acid producing bacteria act best in the lower pH range than methane producing bacteria they are neither so sensitive to fluctuations under the digestion conditions as methane producing bacteria.

Wastewaters containing biologically degradeable organic material have this far been treated among other things in socalled completely mixed reactors, in which acid and methane reactions take place in the same mixed space. Because methane producing bacteria are much more sensitive to the fluctuations under the digestion conditions than acid producing bacteria, the conditions in these kinds of completely mixed reactors must be defined according to the requirements for methane producing bacteria, whereat acid reaction rates have not of course been the best possible in these kinds of completely mixed reactors.

It is known before how to digest anaerobically wastewater sludge, which contains biologically degradeable organic material, in two stages in a digestion reactor in which both stages are fitted inside each other. E.g. from the Finnish Pat. No. 57579 is known a device for digesting wastewater sludge in two successively coupled stages fitted inside each other, whereat sludge water and digested sludge are removed from a second stage, from which a part of sludge is fed back into a first stage. In this kind of a reactor the digestion cannot, however, be performed separately by means of two various types of bacteria, because these automatically would mix with each other when the portion of sludge from the second stage is fed as inoculation sludge into the first stage. This device is thus actually a completely mixed reactor, even though it is divided into two stages inside each other.

It is obvious that the disadvantages caused by the completely mixed reactors can be eliminated by using two reactors coupled to a series whereat the first one of the reactors would act as an acid stage and the second one as a methane stage. This kind of a device were, however, relatively expensive and complicated in comparison with the completely mixed reactor, and in addition it would require more space.

The object of the present invention is thus to provide a device for treatment of wastewater by means of anaerobic fermentation, in which device the acid and methane reactions can be performed under the conditions best adapted to these reactions without essentially mixing acid and methane producing bacteria with each other, and which device is, however, in broad outlines as cheap and simple as the completely mixed reactor.

SUMMARY OF THE INVENTION

According to the present invention there is thus provided an anaerobic fermentator in which the tank has been divided into two superposed parts by means of a filter, which comprises a filter media bed containing at least one filter media, which acts as an attachment bed for methane bacteria and on it a sludge and fluidized material bed, whereat the mixing elements are located below the filter, and the feed elements for wastewater to be treated are fed below the filter, and the elements for removing treated water and gas are located in the tank part above the filter.

The device solution according to the invention is very simple and economical because both the acid and methane reactions are performed in one and the same tank. Both the acid and methane reactions can in the device solution according to the present invention be realized under the nearly optimum conditions and without essentially mixing acid and methane producing bacteria because the tank has been divided into two parts on each other by means of an anaerobic filter, in which a filter media bed consists of one or several, preferably porous filter media which act as an attachment bed for methane producing bacteria, whereat each filter media can be either inert or active in spite of the characteristics of other possible filter media. The acid reactions take then place in a mixing part beneath the filter, to which part the wastewater to be treated is fed and wherefrom wastewater after the acid reactions together with gas formed in the acid reactions rises into the part above the filter at the same time reacting with methane producing bacteria both on the surfaces of the backing material of the filter and in the upper part of the filter.

A sludge portion removed from the part below the filter can be recycled into the reactor but now into the same stage, whereat it does not mix with sludge in the second stage as in the solution according to the Finnish Pat. No. 57579.

Directly below the filter there is advantageously a lamella separator known in itself for dividing the water which streams from beneath through the filter upward evenly across the filter so that the size of bubbles in water is made to grow and sludge portions are separated and returned back into the tank part below the filter.

Gravel, expanded clay (Leca gravel), plastic grain, and different porous materials as coke, coal, slag and activated carbon can be used as filter media for the anaerobic filter. Expanded clay and slag, onto the surfaces of which methane producing bacteria are attached, can, however, be used advantageously. Because of the wide total area on the mentioned materials methane producing bacteria can be attached better.

A relatively thick fluidized bed consisting of sludge and possibly a material, which acts as filter and/or fluidized one, as activated carbon, ash, fly ash, sand, or someone like that is maintained above the anaerobic filter.

The observation was unexpectedly made that when activated carbon according to the present invention was used as filter and fluidized material it was regenerated by itself. Activated carbon was earlier used as filter media for the anaerobic filter according to the German application No. 2531598. In this method wastewater was first treated as means of the anaerobic filter, in which activated carbon was used as filter media, and thereafter by means of anaerobic treatment, too. This method has been tested under different conditions and wastewaters and sludges can be treated by the method but the gas production has been rather slight, and in addition activated carbon has to be changed occassionally, which complicates the treatment and causes interruptions in the production. In the device according to the present invention activated carbon used as a fluidized material has not to be changed, which was a very surprising observation, and no reason for this effect is known. Activated carbon which is used in the device according to the present invention has not thus to changed therefore that its filtration ability would weaken. Materials as activated carbon eliminating toxicity can also be used in the acid stage.

DESCRIPTION OF THE PREFERRED EMBODIMENTS

Figure 1:
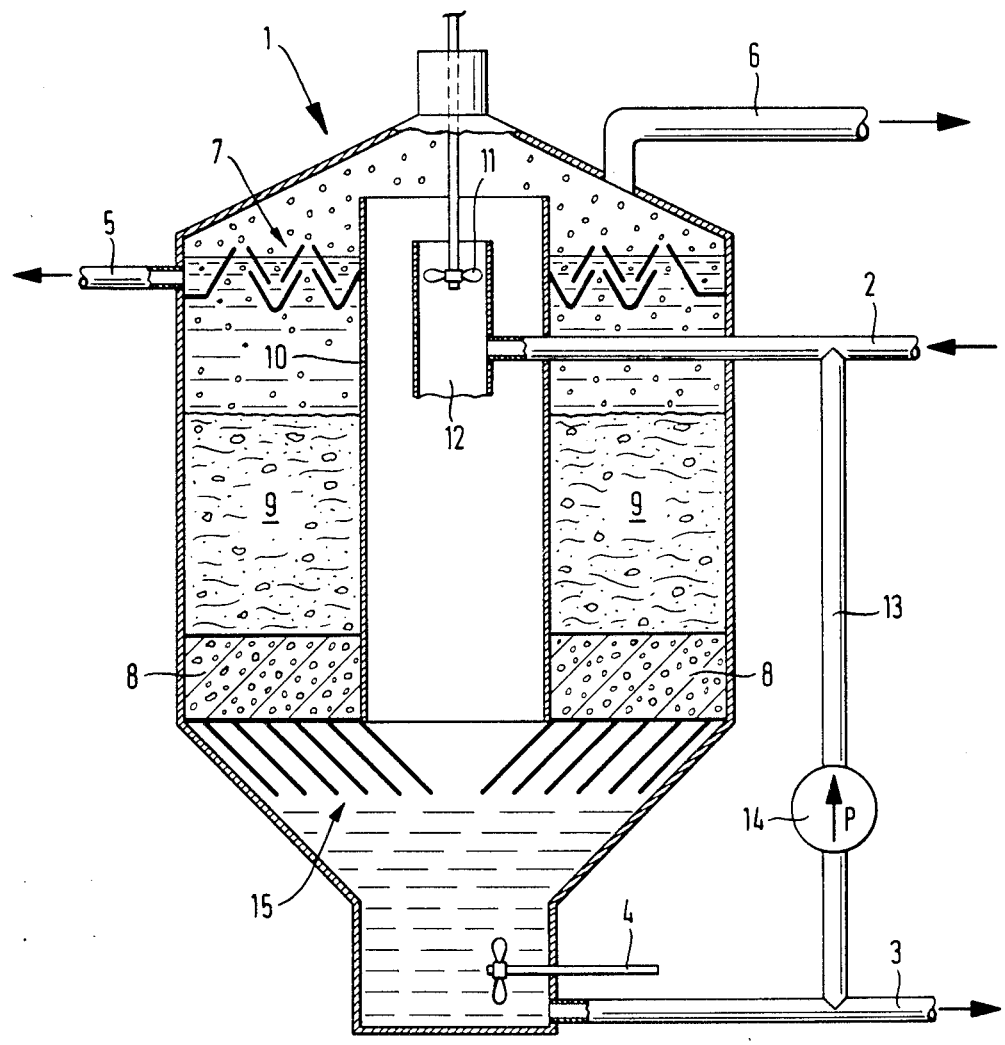
FIG. 1 shows schematically a cross-sectional vertical picture on a favoured embodiment of the invention and FIG. 2 shows the same kind of a vertical picture on an alternative embodiment of the invention.
Figure 2:
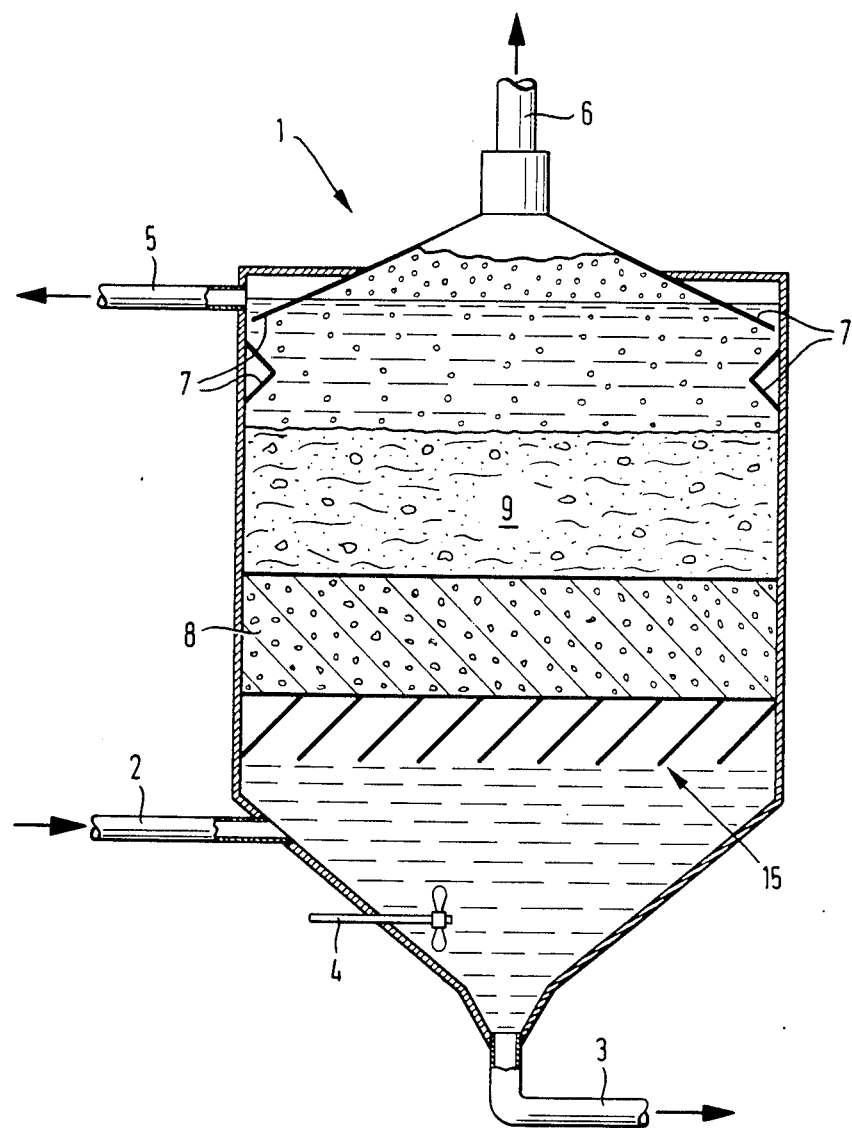

Reference number 1 in the drawing refers in general to a vertical cylindrical reactor. A centrally locating vertical cylinder 10, which is open both from its top and lower end, is fitted inside the reactor 1 in the embodiment shown in FIG. 1. A pipe 12 which is likewise vertical and open from its both ends and which pipe reaches a mixer 11 in the upper part of the reactor 1, and into which pipe a feeder 2 of wastewater to be treated is led from outside of the reactor 1 is fitted in the interior side of the upper part of this vertical cylinder 10.

The reactor 1 is inaddition divided into two parts on each other by means of a filter 8 through which the vertical cylinder 10 is led so that wastewater, which is led through the feeder 2 into the cylinder 10 for treatment and mixing by means of the mixer 11, settles into the part below the filter 8 in which part it is still mixed by a mixer 4 to prevent acid forming bacteria sludge from settling onto the bottom of the reactor 1. For diminishing a sludge amount if the acid stage there is in the lower part of the reactor 1 in addition an outlet pipe 3, from which a pipe 13 branches comprising a pump 14, for feeding part of sludge, removed from the acid stage of the reactor 1, together with wastewater to be treated from the feed pipe 2 into the mixing pipe 12 locating in the vertical cylinder 10. Acid producing bacteria reacts with organic materials of wastewater in the vertical cylinder 10 and in the tank part below the filter 8, forming sludge and gas.

Quite below the filter 8 there is a lamella separator 15 in which water coming from the acid stage is made to stream through diagonally fitted lamellas from beneath upward, for distributing water evenly onto the whole cross-sectional area of the filter 8, to make the size of gas bubbles in water to grow and to separate sludge parts therein and return them into the part below filter 8.

The anaerobic filter 8 contains inert filter media as expanded clay and/or slag, which acts as an attachment bed for methane producing bacteria and which has a great catch surface which prevents slowly growing methane producing bacteria from being washed out. There is a relatively thick fluidized material and sludge bed 9 on the filter 8 for activating proper methane fermentation, whereat a bigger and more evenly divided microbe base is obtained for this reaction space. Activated carbon, which simultaneously acts as filter material, is used as fluidized material. Methane gas is in addition formed in the part above the filter 8 and the gases are separated from a water and sludge mix by means of the bevelling surfaces of the bubble separator 7, which is fitted in the upper part of the reactor tank 1. Finally, treated wastewater and sludge therein are led out of the reaction tank 1 by means of an outlet pipe 5 above the bubble separator 7 and the gases detached in the bubble separator are removed through an outlet pipe 6 in the upper part of the reaction tank 1.

A somewhat simpler embodiment of the device according to the invention in which wastewater to be treated is direct led by means of the pipe 2 into the lower part of the reactor 1, which part is separated by means of the anaerobic filter 8 from the upper part. Excess sludge is removed by means of an outlet pipe 3 out of the lower part of the reactor 1. In the upper part of the reactor 1 there are again elements 7 for separating gas from the mix of treated wastewater and sludge before it is led out by means of the outlet pipe 5. Particularly concerning wastewaters which are difficult to treat the liberation of gas bubbles can be improved by means of a mixer 12, assembled into the upper part of the reactor. Gases are on the contrary removed through a pipe 6, which locates centrally in the upper part of the reactor 1. The better treatment result and greater endurance ability toward toxic materials are obtained by means of the device according to the present invention when activated carbon is used as filter and fluidized material because carbon unexpectedly maintains its conventional filter ability, in other words it regenerates on itself, whereat there is no need to change it during the process. The device according to the invention is in addition very simple and cheap because building, assembly and other side costs and expenses are small and costs of operation are low.

EXAMPLE

A multi-stage reactor according to the present invention has been compared to the before known completely mixed reactor, with regard to the treatment result. The multi-stage reactor according to the invention, which reactor has a acid fermentation stage, a lamella clarifier and above it a filter and fluidized bed stage in the methane fermentation stage, has given a remarkably steadier treatment result than the completely mixed reactor, in which both the acid and methane fermentations take place in the same reaction stage.

Leca gravel and activated carbon grain were used as filter media in the multi-stage reactor according to the invention. The liquid volume of the reactor was 30.8 liters, and the temperature was during the tests 34±1° C. The pH value of wastewater to be treated was regulated to neutral i.e. to pH 7.

The completely mixed reactor and the same experimental arrangement as in the before-mentioned multi-stage reactor were used.

The results obtained by means of the before-mentioned types of a reactor are shown in the table below. The table shows that the multi-stage reactor has a remarkably better reduction of $BOD_7$ (80% on an average) than the completely mixed reactor (50% on an average) has. The multi-stage reactor had also a better reduction of $COD_{Cr}$ and gas production.

TABLE

Experimental results received from the multi-stage and completely mixed reactors.

| | Multi-stage reactor | Completely mixed reactor |
|---|---|---|
| $BOD_7$ reduction $X^x$ | 80 | 50 |
| $BOD_7$ concentration of discharge water mg/l | 150 | 300–600 |
| $COD_{Cr}$ reduction $\%^x$ | 60 | 45 |
| Gas yields $m^3$/kg $BOD_7$ add | 0,20 | 0,15 |
| Operating time, days | 150 | 135 |

$^x BOD_7$ reduction: decrease or reduction of the amount (mg $O_2$/l) of biological oxygen demand during 7 days
$COD_{Cr}$ reduction: reduction of the amount (mg $O_2$/l) of chemical oxygen demand The gas production and $BOD_7$ reduction levels have been varied in both reactors according to characteristics of wastewater.

When the influence of toxic wastewaters was investigated the $BOD_7$ reductions were higher than on an average because the quality of used wastewater was even during the investigation. The influence of toxic water on the operation of the reactor was then observed clearly from the customary fluctuations in that of the reactor. The $BOD_7$ reduction of the multi-stage reactor, which was about 90% in the beginning of this test phase, dropped therefrom when toxic wastewater was treated into the level of about 70% and reset to the former reduction level of about 90% after toxic wastewater ran out. The $BOD_7$ reduction of the completely mixed reactor fell from the corresponding starting level of 80% to the level of about 30% and reset further only to the reduction level of about 70%. From the above the observation is made that toxic wastewaters effected particularly strongly on the operation of the totally mixed reactor. On the other hand, the operation of the multi-stage reactor according to the invention was all the time remarkably steadier, and the fluctuations were smaller. From the above it can be observed that this multi-stage reactor has a remarkably better stability toward toxic wastewaters.

In spite of the long operation (150 days) of the multi-stage reactor the treatment results did not change, although the hydraulic retention time was shortened all the time. There was no need to change activated carbon for improvement of treatment efficiency, as earlier made and also been in general practiced.

What is claimed is:

1. A device for treatment of wastewater by anaerobic fermentation which comprises:
   a closed tank,
   a filter dividing said tank into upper and lower compartments, said upper compartment being useful in the treatment of wastewater with methane producing bacteria and said lower compartment being useful in the treatment of wastewater with acid producing bacteria,
   said filter including a bed of a particulate filter media action as an attachment means for said methane producing bacteria and preventing said methane producing bacteria from being completely removed from said tank with said treated wastewater, said filter further including a fluidized bed overlying said bed of said particulate filter media, said fluidized bed including sludge and a fluidizing agent,
   means for feeding wastewater to be treated into said lower compartment below said filter,
   means for removing treated wastewater, gas and sludge from said upper compartment,
   means for mixing wastewater in said lower compartment, and
   means for separating gas in said upper compartment;
   wherein said upper and lower compartments and said filter are associated such that wastewater fed into said lower compartment is treated with said acid producing bacteria, passed through said filter, and treated with said methane producing bacteria, and wastewater passing from said lower compartment into said upper compartment is incapable of recirculation to said lower compartment.

2. The device of claim 1 further comprising a lamella separator below said filter in said lower compartment, said lamella separator distributing water upwardly and evenly through said filter facilitating the growth of the bubbles in said wastewater, and separating portions of sludge in said wastewater and returning them to said lower compartment.

3. The device according to claim 1 wherein said means for feeding wastewater to be treated into said lower compartment comprises a vertically oriented cylinder open at its opposite ends extending from said lower compartment through said filter and into said upper compartment to a point above said means for separating gas in said upper compartment, and said means for feeding wastewater to be treated into said lower compartment communicating with the upper portion of said cylinder.

4. The device according to claim 3 further comprising a mixing means provided in the upper portion of said cylinder.

5. The device of claim 4 further comprising a means for removing wastewater from said lower compartment and recirculating said wastewater to said upper portion of said cylinder.

6. The device according to claim 1 wherein said particulate filter media comprises gravel.

7. The device according to claim 1 wherein said particulate filter media comprises slag.

8. The device according to claim 1 wherein said particulate filter media and said fluidizing agent are the same.

9. The device according to claim 8 wherein said particulate filter media and said fluidizing agent are activated carbon.

* * * * *